United States Patent
Subhash et al.

(10) Patent No.: US 12,465,218 B2
(45) Date of Patent: Nov. 11, 2025

(54) SYSTEM AND DEVICES FOR MULTISPECTRAL 3D IMAGING AND DIAGNOSTICS OF TISSUES, AND METHODS THEREOF

(71) Applicant: Colgate-Palmolive Company, New York, NY (US)

(72) Inventors: Hrebesh Molly Subhash, Somerset, NJ (US); Benny E. Urban, Jr., Westfield, NJ (US)

(73) Assignee: Colgate-Palmolive Company, New York, NY (US)

( * ) Notice: Subject to any disclaimer, the term of this patent is extended or adjusted under 35 U.S.C. 154(b) by 420 days.

(21) Appl. No.: 17/569,708

(22) Filed: Jan. 6, 2022

(65) Prior Publication Data

US 2022/0240786 A1    Aug. 4, 2022

Related U.S. Application Data

(60) Provisional application No. 63/144,612, filed on Feb. 2, 2021.

(51) Int. Cl.
*A61B 5/00* (2006.01)
*A61B 1/24* (2006.01)
(Continued)

(52) U.S. Cl.
CPC .............. *A61B 5/0088* (2013.01); *A61B 1/24* (2013.01); *A61C 19/04* (2013.01); *G06T 3/4038* (2013.01);
(Continued)

(58) Field of Classification Search
CPC ....... A61B 5/0088; A61B 1/24; A61B 5/0075; A61B 5/682; A61C 19/04; A61C 9/006;
(Continued)

(56) References Cited

U.S. PATENT DOCUMENTS 7,092,087 B2    8/2006 Kumar et al.
7,813,591 B2    10/2010 Paley et al.
(Continued)

FOREIGN PATENT DOCUMENTS

| | | |
|---|---|---|
| CN | 105395184 | 3/2016 |
| EP | 2599433 | 6/2013 |
| WO | 2019/207588 | 10/2019 |

OTHER PUBLICATIONS

Logozzo et al., "Recent advances in dental optics—Part II: Experimental tests for a new intraoral scanner", 2014 (Year: 2014).*
(Continued)

*Primary Examiner* — Adil Partap S Virk

(57) ABSTRACT

An imaging system, device, and method for diagnosing tissue is provided. The system may include one or more light sources (e.g., LEDs) configured to project light in a plurality of wavelengths. A time-of-flight module may be configured to project a modulated light, receive a reflected portion of the modulated light, and/or generate a three-dimensional time-of-flight image based on the received reflected portion of the modulated light. A multispectral camera may be configured to receive a reflected portion of the light and generate a multispectral image based on the received reflected portion of the light. A processor may be configured to identify the time-of-flight image and the multispectral image; generate a data matrix based on combining one or more portions of the time-of-flight image and the multispectral image; and cause the data matrix to be displayed as a three-dimensional image.

16 Claims, 10 Drawing Sheets

(51) Int. Cl.
*A61C 19/04* (2006.01)
*G06T 3/4038* (2024.01)
*G06T 7/00* (2017.01)

(52) U.S. Cl.
CPC .. *G06T 7/0012* (2013.01); *G06T 2207/10028* (2013.01); *G06T 2207/30036* (2013.01)

(58) Field of Classification Search
CPC ............... G06T 3/4038; G06T 7/0012; G06T 2207/10028; G06T 2207/30036; G01S 17/89; A46B 2200/1066; A46B 15/0034
See application file for complete search history.

(56) References Cited

U.S. PATENT DOCUMENTS

| | | | |
|---|---|---|---|
| 9,301,692 | B2 | 4/2016 | Kaji et al. |
| 9,436,868 | B2* | 9/2016 | Dillon ..................... A61C 9/006 |
| 9,999,354 | B2 | 6/2018 | Rousseau et al. |
| 10,123,706 | B2 | 11/2018 | Elbaz et al. |
| 10,585,173 | B1* | 3/2020 | Zhu ......................... G01S 17/42 |
| 10,708,574 | B2* | 7/2020 | Furst ...................... A61B 1/063 |
| 11,096,586 | B1* | 8/2021 | Belthangady ........ A61B 5/7267 |
| 2005/0024646 | A1* | 2/2005 | Quadling ............. A61B 5/0088 |
| | | | 356/477 |
| 2005/0283065 | A1* | 12/2005 | Babayoff ............... H04N 13/15 |
| | | | 600/407 |
| 2008/0062429 | A1* | 3/2008 | Liang ..................... A61B 1/043 |
| | | | 356/497 |
| 2008/0063998 | A1* | 3/2008 | Liang ................. G01B 11/2441 |
| | | | 433/29 |
| 2009/0298017 | A1* | 12/2009 | Boerjes ................. G06T 1/0007 |
| | | | 433/214 |
| 2014/0146142 | A1* | 5/2014 | Duret ..................... A61C 19/04 |
| | | | 348/46 |
| 2014/0300753 | A1 | 10/2014 | Yin et al. |
| 2015/0085293 | A1 | 3/2015 | Wang et al. |
| 2015/0350517 | A1 | 12/2015 | Duret et al. |
| 2017/0071713 | A1* | 3/2017 | Nakai ....................... A61C 5/44 |
| 2018/0168780 | A1* | 6/2018 | Kopelman ........... G06V 10/758 |
| 2018/0367786 | A1* | 12/2018 | Furst .................... A61B 1/00096 |
| 2018/0368656 | A1* | 12/2018 | Austin ...................... A61B 1/24 |
| 2019/0046276 | A1* | 2/2019 | Inglese .................. A61C 1/082 |
| 2019/0117075 | A1* | 4/2019 | Fan ........................ A61B 5/0073 |
| 2019/0183346 | A1* | 6/2019 | Islam ..................... G01N 33/49 |
| 2019/0293525 | A1 | 9/2019 | Bauer et al. |
| 2019/0377068 | A1* | 12/2019 | Lipson ................... G02B 27/42 |
| 2020/0288982 | A1* | 9/2020 | Islam ..................... G01J 3/0218 |
| 2020/0359777 | A1* | 11/2020 | Pesach .................... A61C 9/006 |
| 2021/0140763 | A1* | 5/2021 | Pesach ................. A61B 5/0088 |
| 2021/0393136 | A1* | 12/2021 | Inagaki ................ A61B 5/0073 |
| 2023/0036312 | A1* | 2/2023 | Coffey .................. A61B 5/4833 |
| 2023/0068727 | A1* | 3/2023 | Saphier ................... G06T 17/20 |
| 2023/0149135 | A1* | 5/2023 | Lipnik ................. A61C 9/0053 |
| | | | 433/214 |
| 2023/0222767 | A1* | 7/2023 | Ertl ....................... G06V 10/764 |
| | | | 600/408 |

OTHER PUBLICATIONS

International Search Report and the Written Opinion of the International Searching Authority issued in International Application PCT/US2022/011385 mailed Apr. 29, 2022.

* cited by examiner

SYSTEM AND DEVICES FOR MULTISPECTRAL 3D IMAGING AND DIAGNOSTICS OF TISSUES, AND METHODS THEREOF

CROSS-REFERENCE TO RELATED APPLICATION

This application claims the benefit of priority from U.S. Provisional Application No. 63/114,612, filed Feb. 2, 2021, the contents of which are hereby incorporated herein by reference in their entirety.

BACKGROUND

Tissue health problems can take many forms. For example, tissue health problems may include tooth decay, oral cancer, and periodontal disease. Periodontal disease is often caused by certain bacterial species in the mouth that interact with proteins present in saliva to form a film, known as plaque, that coats the teeth. If this biofilm build up progresses, the acid produced by the bacteria can attack the teeth resulting in tooth decay. The plaque also may attack the soft gum tissue of the mouth leading to gingivitis, which affects the gums, or periodontitis, which may affect all of the soft tissue and bone supporting the teeth. Without early and accurate diagnostic methods, these conditions can become chronic and present physical pain to patients and burden them with medical/dental procedures.

Other oral conditions, such as gingivitis, inflame the gums and are characterized by redness, swelling, bleeding, and sensitivity. These changes result from an accumulation of biofilm along the gingival margins and the immune system's inflammatory response to the release of destructive bacterial byproducts. Gingivitis results in increased vascularity and morphological change in the vascular architecture, hemodynamics and tissue oxygenation. Monitoring and assessment of local inflammatory hemodynamic profiles such as tissue oxygen saturation (StO2), total tissue hemoglobin (tHb), deoxyhemoglobin (Hb) and oxygenated hemoglobin (HbO2) of gingiva during disease progression and response to therapy is crucial for understanding the pathophysiology. The early stages of gingivitis are reversible with thorough brushing and flossing. Without adequate oral hygiene, however, chronic infections and periodontitis can develop.

At present, there is no reliable consumer or clinical level early problem diagnostic systems which can provide indicators of volumetric, spectroscopic diagnostics of tissues such as micro-morphological changes, dynamics of functional and spectroscopic information in a quantitative depth resolved manner. Such a device is desired, as it would greatly benefit clinical and home care for users and could have great benefits in chronic tissue disease prevention.

BRIEF SUMMARY

The present disclosure may be directed, in one aspect, to an imaging system for diagnosing tissue. The system may include a ring array comprising one or more illumination sources (e.g., LEDs) configured to project light in a plurality of wavelengths and along an optical path. A time-of-flight module including a time-of-flight sensor and an illuminator may be provided, wherein the illuminator is configured to project a modulated light along the optical path upon the tissue and the time-of-flight sensor is configured to receive a reflected portion of the modulated light projected upon the tissue and generate a three-dimensional time-of-flight image based on the received reflected or emitted portion of the modulated light. A multispectral camera may be configured to receive a reflected portion of the light projected in the plurality of wavelengths and generate a multispectral image based on the received reflected portion of the light. A processor may be configured to identify the time-of-flight image generated via the time-of-flight sensor and the multispectral image generated via the multispectral camera; generate a depth- and spectra-encoded data matrix based on combining one or more portions of the time-of-flight image and the multispectral image; and cause the depth- and spectra-encoded data matrix to be displayed as a three-dimensional image via a display.

In another aspect, the present disclosure may be directed to a method for diagnosing tissue. The method may include projecting, via one or more illumination sources (e.g., LEDs), light upon the tissue in a plurality of wavelengths and along an optical path; projecting a modulated light along the optical path and upon the tissue, and receiving a reflected portion of the modulated light projected upon the tissue; generating a three-dimensional time-of-flight image based on the received reflected or emitted portion of the modulated light; receiving a reflected portion of the light projected in the plurality of wavelengths and generating a multispectral image based on the received reflected portion of the light; generating a depth- and spectra-encoded data matrix based on combining one or more portions of the time-of-flight image and the multispectral image; and causing the depth- and spectra-encoded data matrix to be displayed as a three-dimensional image.

BRIEF DESCRIPTION OF THE DRAWINGS

The present disclosure will become more fully understood from the detailed description and the accompanying drawings, wherein.

DETAILED DESCRIPTION

Figure 1A:
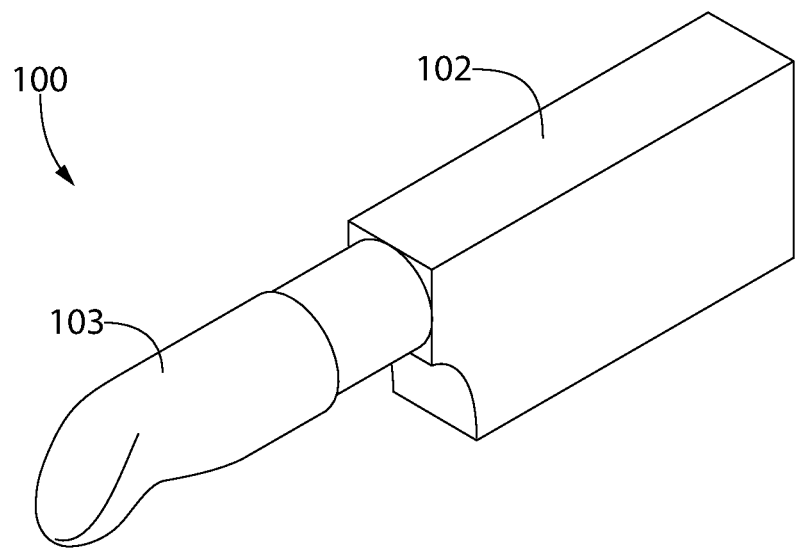
FIGS. 1A, 1B are perspective views of example multispectral imaging and diagnostic system, as described herein.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Tissue health problems can take many forms. For example, melanoma, dry skin, tooth decay, oral cancer, periodontal disease, winkles, dermatitis, rosacea, hyperpigmentation, sun damage, hyperplasia, spider veins, melisma, milia, versicolor, and acne are tissue health problems. Periodontal disease and tooth caries are often caused by certain bacterial species in the mouth that interact with proteins present in saliva to form a film, known as plaque, that coats the teeth. If this biofilm build up progresses, the acid produced by the bacteria can attack the teeth resulting in tooth decay. The plaque may also attack the soft gum tissue of the mouth, leading to gingivitis, which may affect the gums, or periodontitis, which may affect all of the soft tissue and bone supporting the teeth. Without early and accurate diagnostic methods, these conditions can become chronic and present physical pain to patients and burden them with medical/dental procedures.

Other common oral conditions, such as gingivitis, inflame the gums and are characterized by redness, swelling, bleeding, and sensitivity. These changes result from an accumulation of biofilm along the gingival margins and the immune system's inflammatory response to the release of destructive bacterial byproducts. Gingivitis results in increased vascularity and morphological change in the vascular architecture, hemodynamics and tissue oxygenation. Monitoring and assessment of local inflammatory hemodynamic profiles such as tissue oxygen saturation (StO2), total tissue hemoglobin (tHb), deoxyhemoglobin (Hb) and oxygenated hemoglobin (HbO2) of gingiva during disease progression and response to therapy is crucial for understanding the pathophysiology. The early stages of gingivitis are reversible with thorough brushing and flossing. Without adequate oral hygiene, however, chronic infections and periodontitis can develop.

A consumer or clinical level early problem diagnostic system is described herein. Such system may provide indicators of volumetric, spectroscopic diagnostics of soft and/or hard tissues (e.g., micro-morphological changes, dynamics of functional and spectroscopic information) in a quantitative depth resolved manner. Such a device may benefit clinical and home care for users and may have great benefits in chronic tissue disease prevention.

A high-resolution scanner (e.g., 3D scanner) is described herein. The high-resolution 3D scanner may be based on structured illumination 3D image reconstructions. In structured light, a pattern is projected on to the target. Deformations in the structure may allow for mathematical determinations of the 3D features of the target. In an example, the system may include a sensor (e.g., haptic sensor) that may provide real-time feedback about the progress of scanning while performing self-scanning of the oral cavity.

3D proximity imaging (e.g., sensing) is described herein. For example, time-of-flight (ToF) 3D imaging is described herein. Although ToF 3D imaging is described herein, such imaging is only one method of imaging and is not intended to be limiting. For example, 3D proximity imaging may include one or more of ToF imaging, patterned/structured illumination, stereo vision, active stereo vision, and/or lidar. Lidar may include a time-of-flight method and/or frequency domain method, for example, that may use a continuous wave (CW) laser.

In an example, the ToF 3D imaging may include a 3D point cloud/image in which data may be provided in x-pixel, y-pixel, and xy-depth). ToF 3D imaging may be more simplistic than high-resolution 3D scanners. ToF imaging may send ultrashort pulses of light at the target. The light is then scattered back to a fast detection sensor. By measuring the time that the light took to hit the target and scatter back to the sensor, it may be possible to calculate the distance the target is from the sensor. For example, in the case of ToF modules, dot projectors may be incorporated for more spare illumination, which may minimize multiple reflection artifacts. Because of the processing (e.g., the simplistic processing), ToF 3D imaging may achieve imaging rates that are far beyond structured illumination 3D imaging (e.g., between 30-60 Hz).

Multispectral imaging (e.g., 3D imaging) with ToF camera(s) may be performed. For example, multispectral imaging (e.g., 3D imaging) with ToF cameras may be performed by overlaying the 3D depth map with a visible light image of the target captured by a spectral camera. Multispectral imaging may use two or more (e.g., three) wavelengths simultaneously to provide spectral images for tissue diagnostics. To generate diagnostic images, the 3D depth map is utilized to determine tissue angle and distance. The angle and distance, along with the measured intensity of the reflected light by the multispectral camera (e.g., snap-shot multispectral camera), are then used to determine tissue absorption more accurately than a 2D image. The known absorption constants of tissue chromophores are then used to quantitatively or qualitatively determine the chromophore concentration map. The chromophore concentration map is used to diagnose the tissue health and to generate 2D and/or 3D diagnostic images. For example, high resolution topographic images may be generated that may be used for longitudinal morphological analysis of soft and/or hard tissue, such as tissue relating to the oral cavity, skin, and/or face. The diagnostic images may be used to identify structures (e.g., distinct structures) at one or more depths with an object. For example, the images may provide spectroscopic, fluorescence, and/or colorimetric information relating to soft and/or hard tissue, such as tissue relating to the oral cavity, skin, and/or face.

Multispectral imaging at high frame rates may be used for disease diagnostics, skin health evaluations, and oral health evaluations. For example, blood and tissue oxygenation, blood concentration, melanin distribution, collagen density, skin water content, skin cancers, oral biofilms, wrinkles, and tooth whiteness may be determined using multispectral imaging. With high speed imaging, pulse, blood pressure, oxygen metabolic rate, and/or real-time blood flow may be biometric measurements that may be determined. For example, by using UV/blue excitation and overlaying the collected fluorescence with the 3D ToF data, quantitative light fluorescence may be used for diagnostics.

3D scanners may rely on structured illumination for 3D image acquisition. Because of the complexity and large computational power necessary for 3D scanners, 3D scanners may be prohibitively expensive (e.g., for home care) and/or highly limited in clinical applications. In contrast, ToF cameras may be inexpensive and integrated into computers and/or smart devices for facial recognition, making the technology widely available on a consumer level. Such features may allow the infrastructure of ToF cameras to be used for home diagnostics when applied with multispectral cameras and calibrated light sources.

To overcome the technical difficulties of current 3D scanners and/or to make tissue diagnostic technology more available for consumers and clinicians, a cost-effective, multispectral, volumetric tissue diagnostic imaging system may be provided, as described herein. The system may achieve 3D imaging using an illuminator (e.g., a modulated sparse illumination projector) in combination with a ToF 2D array sensor. Multispectral imaging may be achieved by acquiring (e.g., simultaneously acquiring) a 2D multispectral image of the target and combining the 3D ToF and 2D multispectral information into a data matrix (e.g., depth- and spectra-encoded data matrix) that contains 3D position and spectral information.

As described herein, the data matrix may be displayed as a 3D stitched image. In an example, the data matrix may be displayed during the stitching process so the user can ensure the data of a region (e.g., region of the oral cavity, etc.) was acquired. Real-time image stitching may be achieved using an image structural fit technique and an inertial measurement unit (IMU) to determine device orientation/location. Real-time 3D image stitching may be achieved using a sophisticated Extended Kalman Filter-Simultaneous Localization and Mapping (EKF-SLAM) that may combine a 3D point cloud ToF image and an inertial measurement unit (IMU) to determine device orientation/location in 3D space. In an example, data from an image (e.g., a single 3D snap-shot image) may be used to match/stitch a subsequent image using a technique (e.g., SLAM). The high speed frame rate of the ToF sensor may provide accurate and/or timely image stitching, which may allow for volumetric tissue imaging and analysis (e.g., large volumetric tissue imaging and analysis). For example, the multispectral images may be used to aid stitching by identifying structures which can be aligned and matched by a stitching technique. For example, a stitching (e.g., 3D real-time stitching) of overlayed point cloud and multispectral data may be used to generate a 3D spectral map of an entirety of an oral cavity based on an inertial measurement unit (IMU) and SLAM technique.

Figure 1B:
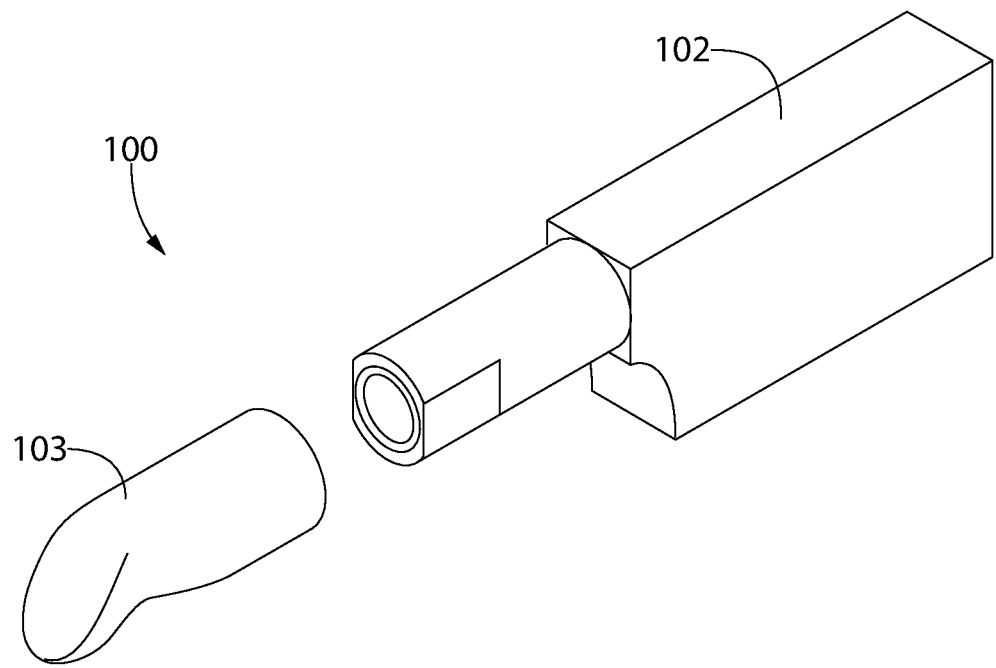

A 3D multispectral (e.g., spectroscopic) imaging and diagnostic system may be provided. The 3D multispectral imaging and diagnostic system may have a small form factor and/or be hand-held. The 3D multispectral imaging and diagnostic system may be based on an integrated ToF module with modulated sparse illumination, a multispectral camera for quantitative tissue diagnosis, and an inertial measurement unit (IMU) integrated onto an internal SoC for device orientation determination. The IMU may be an electronic device that measures and/or reports a force, angular rate, orientation, and the like, using accelerometers, gyroscopes, magnetometers, and the like. An example system is illustrated in FIGS. 1A, 1B. FIGS. 1A, 1B show perspective views of the example device with attached angled mirror head (FIG. 1A) and with angled mirror head removed (FIG. 1B).

The system 100 includes a hand-held body 102 with one or more mirrors, such as a detachable angled mirror head 103. The system 100 may be directly or wirelessly coupled to a data processing and display unit which can be a laptop or tablet computer. For example, system 100 may include real-time visual feedback to a smart phone or tablet while performing intraoral scanning (e.g., self-intraoral scanning). The system may include a processor, such as a system on chip (SoC). The SoC may be housed in the body of the device and may act as the data processing unit. The SoC may be an integrated circuit that integrates one or more components, such as a central processing unit (CPU), graphics processing unit (GPU), memory, input/output ports, communication interfaces, and the like. The components may be housed on a single substrate or multiple substrates.

Data determined by the SoC may be streamed (e.g., wirelessly streamed) to a receiving unit for display. The receiving unit may be a computer program tasked with displaying the information directly or applying further processing to the information before displaying on a display unit. The data may be wirelessly streamed to an external server (e.g., the cloud) for external computing. The results from the external computing may be streamed to a portable device, such as a laptop or smart device. The body 102 may house one or more optical components for directing and shaping light, illumination sources, and/or image acquisition units.

As described herein, light may be projected upon the tissue (e.g., oral cavity tissue, facial tissue, and the like) in a plurality of wavelengths and/or along an optical path. The light may be projected via one or more illumination sources (e.g., LEDs). A modulated light may be projected along the optical path and upon the tissue. A reflected portion of the modulated light projected upon the tissue may be received. A three-dimensional time-of-flight image may be generated based on the received reflected portion of the modulated light. A reflected portion of the light projected in the plurality of wavelengths may be received. A multispectral image based on the received reflected portion of the light may be generated. A depth- and spectra-encoded data matrix may be generated based on combining one or more portions of the time-of-flight image and the multispectral image. The depth- and spectra-encoded data matrix may be displayed as a three-dimensional image.

In an example, the 3D depth profile data may be used as an indicator for various gum conditions, such as gingivitis (e.g., tissue volume change due to inflammation), gum recession (e.g., reduction in marginal gingival tissue volume), and the like. The 3D depth profile data may be used for overlying various soft and hard tissue parameters, for example, as a pseudo color map (e.g., at the user/consumer side). The soft and/or hard tissue parameters may be derived from the multispectral spectral sensor data, such as spatial profiling of caries, plaque (e.g., biofilm concentration), oxy-deoxy and oxygen saturation map, dental stain map, etc.

Figure 2A:
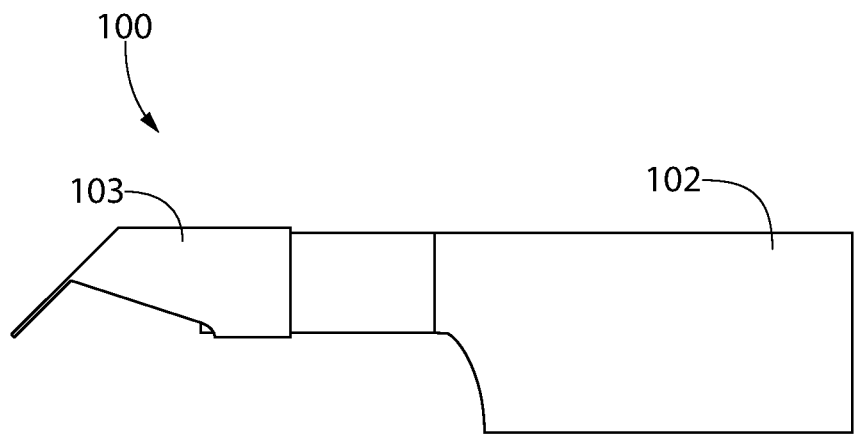
FIGS. 2A-2C are views of the example multispectral imaging and diagnostic system as shown on FIGS. 1A, 1B.
Figure 2B:
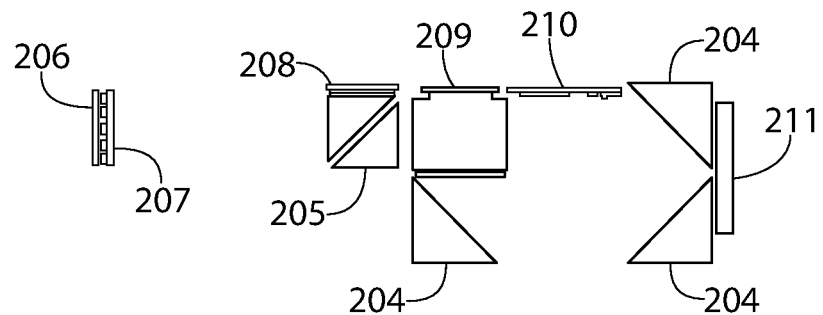
Figure 2C:
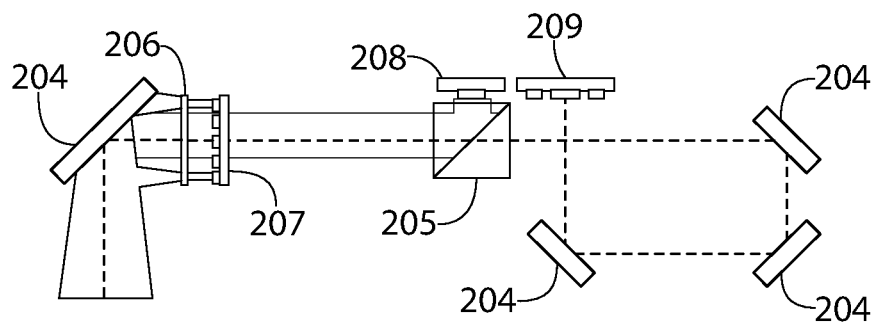

FIGS. 2A-2C show example components of system 100. FIG. 2A shows a side view of system 100, as provided on FIGS. 1A, 1B. FIGS. 2B, 2C show internal components of system 100.

As provided on FIGS. 2B, 2C, internal mirrors 204 may be provided. For example, internal mirrors 204 may be provided to direct the ToF modulated light (dashed line shown on FIG. 2C) through system 100 (e.g., the body of system 100). In an example, the ToF modulated light may pass through a visible-NIR reflection/IR transmission beam splitter 205 before being incident on an object (e.g., sample, such as tissue, teeth, and the like). In the example of an angled mirror head, the ToF modulated light may be directed (e.g., redirected) to the object by the angled mirror head 103 (FIG. 2A). A ring diffuser 206 may be used to homogenize one or more (e.g., different) array light sources. For example, a ring diffuser 206 may be placed in front of an illumination ring array 207 to homogenize different array light sources.

Ring array 207 may contain one or more illumination sources (e.g., LEDs) with wavelengths ranging between 370-415 nm (UV/blue) for inducing fluorescence, 415-670 nm (visible) for reflection measurements, and 820-1700 nm (NIR/IR) for near-infrared/infrared reflection measurements. In examples, the LED ring may contain short-wave infrared (SWIR) light sources for imaging deeper into the tissue. The homogenized light may be incident on the sample and/or, in the case of using the angled mirror head, reflected towards the target. The device body may contain a multispectral camera 208 that may be located, for example, above the beam splitter 205. The multispectral camera 208 may be an RGB, multi-channel near-infrared (NIR) camera, camera with specific visible and NIR channels. In examples, the multispectral channel may have one or more SWIR sensitive channels. A ToF module 209, which may contain the ToF sensor and sparse projector (e.g., illumination projector), may be positioned above the first internal reflection mirror. The projected light from the module may be guided by the mirrors through the body.

The ToF sensor may collect reflected light (e.g., IR light) that has scattered off the target and been redirected through the system by the mirrors 204. The mirrors may be coated for reflecting the projected light with high efficiency and transmitting or absorbing other wavelengths. Optical filters may be used along the optical path and/or in front of the ToF module to block non-IR light from hitting the sensor (e.g., lowering background noise). In an example, SoC 210 may be used to acquire the multispectral and/or ToF depth encoded images. SoC 210 may combine the images into a depth- and spectra-encoded data matrix. For example, the multispectral and ToF images may be combined by overlaying the images on top of one another. In an example, the FOV of each of the cameras (e.g., the ToF camera and the multispectral camera) may be overlapped to overlay the images, although in examples the images may be overlayed by other techniques. The data matrix may be sent (e.g., sent in real-time) directly or wirelessly to a display or other processing unit with a display. The data matrix may be displayed as a 3D image (3D stitched image). In examples, the SoC may be used for one or more (e.g., all) computations and may send results to a display and/or external processing/storage device. One or more components of system 100 may be powered by a battery (e.g., rechargeable battery 211) or a power cord.

The ToF module may require that an object be a minimum distance from the sensor, for example, for accurate imaging. The distance may be based on modulation and/or other electronic factors of the ToF module. Further, the depth accuracy of the ToF module may be related to the ability of the ToF module to detect the phase difference between modulated illumination light. Because of the high speed of light through air, the module may be limited to approximately a 3 mm depth resolution. Because light travels more slowly through high refractive index materials, the minimum imaging distance may be shortened and/or the depth resolution may be improved by sending the light through a high refractive index material.

Figure 3A:
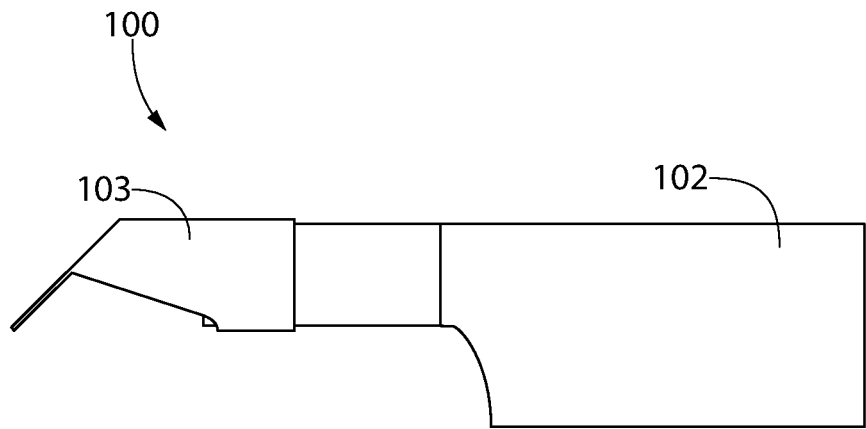
FIGS. 3A-3C are views of the example multispectral imaging and diagnostic system as shown on FIGS. 1A, 1B.
Figure 3B:
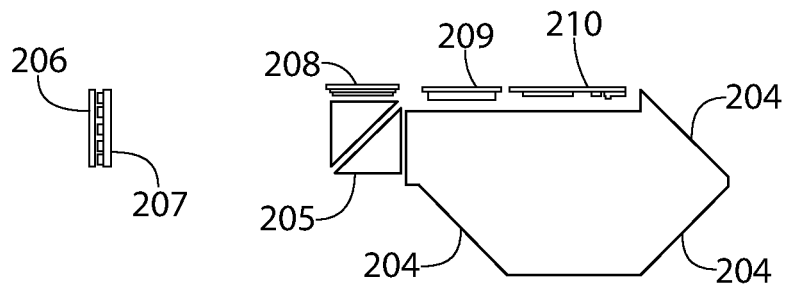
Figure 3C:
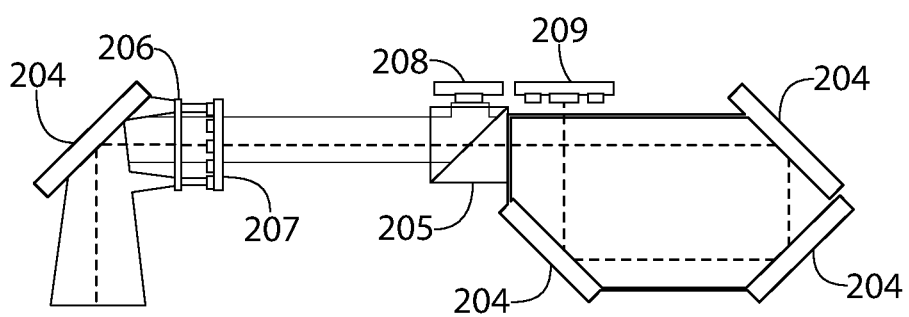

FIGS. 3A-3C show examples of the system 100 where the internal optics are comprised of a high refractive index material that is transparent in the IR wavelengths. FIG. 3A shows a side view of system 100, as provided on FIGS. 1A, 1B. FIGS. 3B, 3C show internal components of system 100. Like numbered elements in FIGS. 2A-2C and 3A-3C show similar components.

The ToF sensor may be coupled to the high refractive index material or the ToF may be coupled to the high refractive index prism using another material with a refractive index similar to the prism, such as a high refractive index glue or liquid. The high refractive index prism may have flat surfaces with IR reflective coatings which act as mirrors for the modulated IR light used for ToF measurements. The coatings may include, for example, alternating high and lower dielectric constant layers of TiO2 (titanium dioxide) and SiO2 (silicon dioxide). Other examples may include alternating one or more thin layers of thin dielectric materials having different (e.g., significantly different) dielectric constants. The layers may be, for example, 10s to 100s of nanometers thick and/or may be customized to different wavelengths. The coatings may be applied to one or more components of system 100, such as to one or more of multispectral camera 208, ToF module 209, mirrors 204, and the like.

To lower refractive index mismatch (e.g., to back reflection into the prism system) the beam splitter 205 may be attached to the prism (e.g., without an air interface) or attached using a refractive index material, such as a high refractive index liquid or glue. Some examples of high refractive index materials may include (a) N-BK7 glass—NA=1.52, (b) germanium—NA=4, (c) sapphire—NA=1.77, (d) polycarbonate plastics—NA~1.7, and (e) zinc sulfide—NA=2.63. The speed of light through high refractive index materials may be slower and is governed by the equation:

$$velocity = \frac{NA_{air}}{NA_{material}} * c$$

where 'velocity' is the velocity of light through the material, is the refractive index of air, '$NA_{material}$' is the refractive index of the material, and 'c' is the speed of light in a vacuum constant. In an example, the speed of light may be reduced to 25%-65% of its speed in a vacuum. If the ToF sensor surface is directly coupled to the transmission material (e.g., without an interface), the reduction in the speed of light may result in higher depth resolution and/or a shorter minimum distance of the target from the sensor. For example, for a sensor in air with a 3 mm depth resolution, a sensor coupled to germanium should achieve approximately 0.75 mm depth resolution.

Figure 4A:
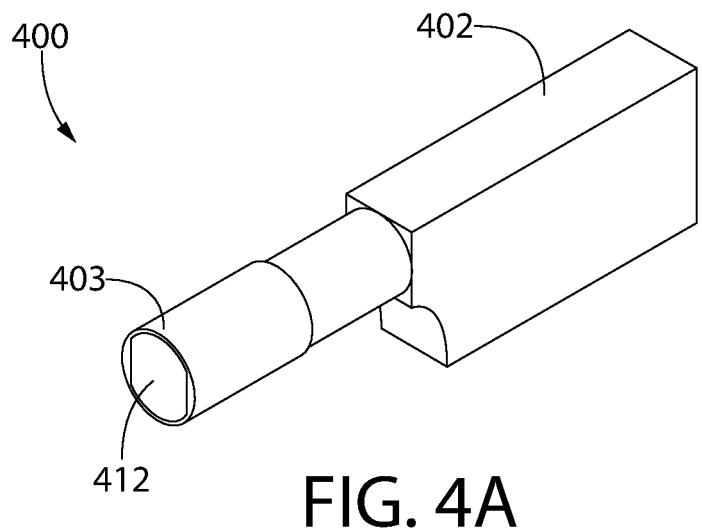
FIGS. 4A-4C are views of another example multispectral imaging and diagnostic system, as described herein.
Figure 4B:
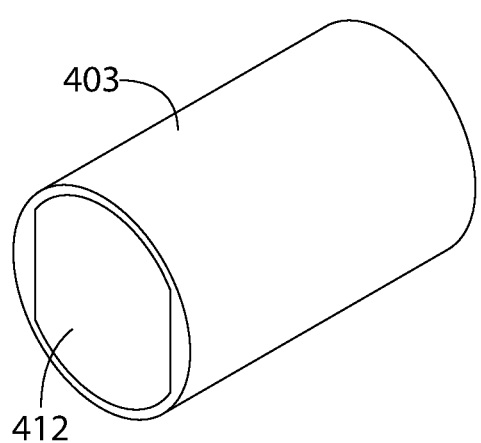
Figure 4C:
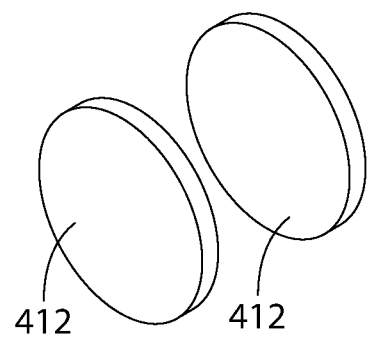

Examples of the device 400 may include body 402 and/or one or more detachable scan heads, such as scan heads 403 shown in FIGS. 4A-4C. For example, the angled mirror head (shown in FIG. 1A) may be used for intraoral applications, whereas removing the angled mirror head may allow for external tissue imaging. The angled mirror (e.g., end mirror) may be heated to defog the mirror surface due the inhale and/or exhale that may form condensation and fogging of the mirror. For example, the angled mirror may be heated using a heating element at the bottom surface with an electrically conductive heating element that generates heat using Joule heating process. As another example, a scan head with a lens 412 may be used to adjust the magnification of the field-of-view (FOV). The focal length of the scan head lens may be matched with the focal length of the internal multispectral camera and ToF module to account for changes in the magnification.

Figure 5A:
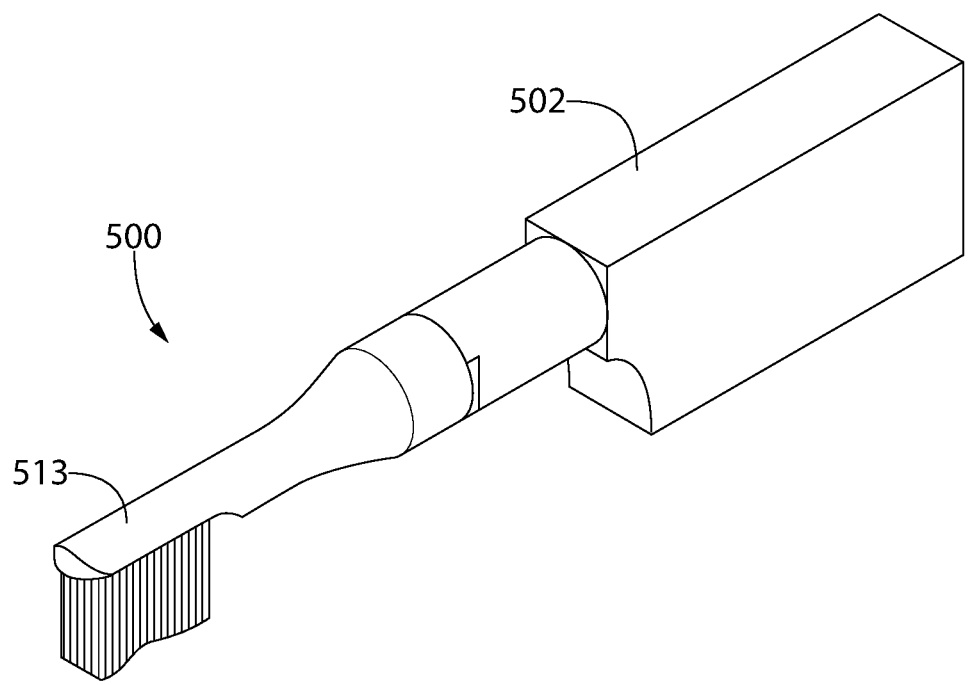
FIGS. 5A, 5B are views of a scanner with cleaning brush head, as described herein.
Figure 5B:
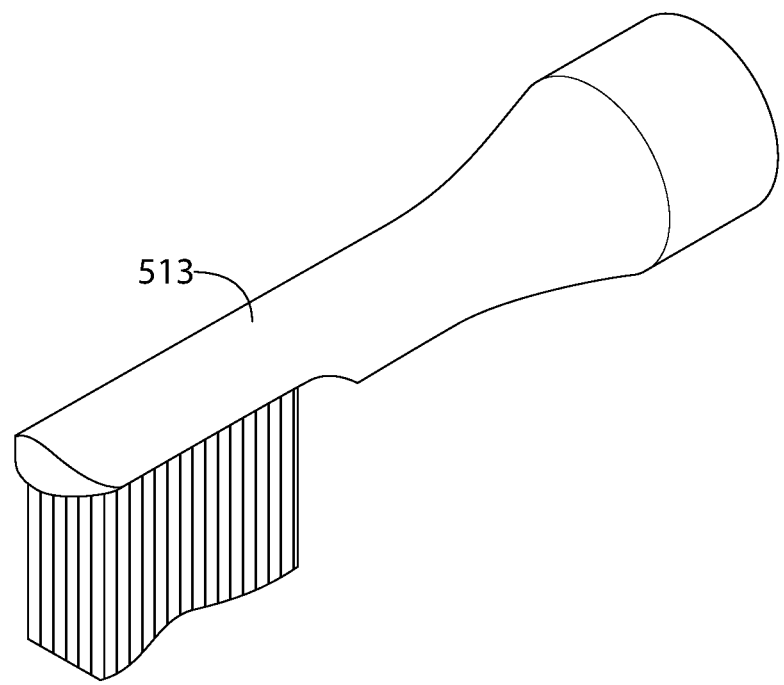

In examples, the 3D scanner may be (e.g., may be coupled to) a hybrid, multifunctional device for hygiene. FIGS. 5A, 5B depict an example device 500 with a hand-held body 502 and a detachable cleaning brush head 513 for oral hygiene. Hand-held body 502 may include components similar to those described for hand-held body 102. In examples, the cleaning brush head 513 may be one of the optional detachable heads to the scanning device. In such examples, the 3D scanner may act as a type of smart brush that a user can use to clean their oral cavity and/or to scan the oral cavity before, during, or after brushing. The internal components of the 3D scanning smart brush may include one or more of the example components described herein. The body shape may have a user-friendly form for teeth brushing.

Figure 6:
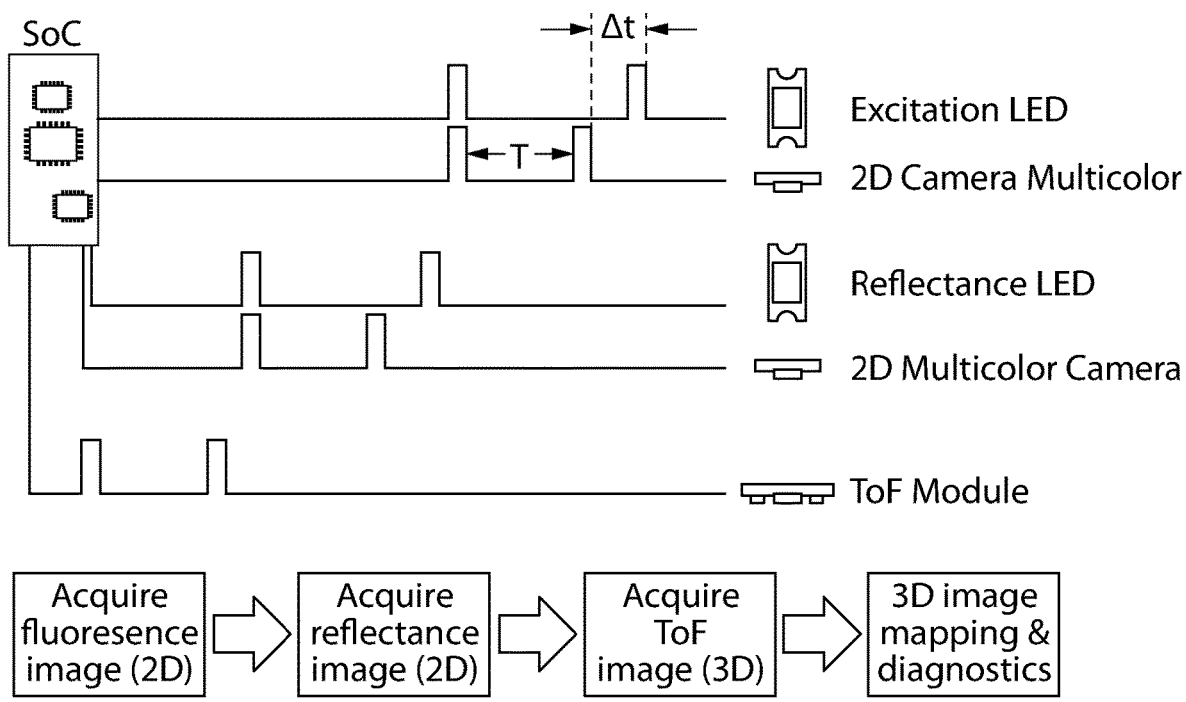
FIG. 6 is a block diagram of an example illumination method, as described herein.

FIG. 6 shows an example illumination method. Illumination may be controlled by an SoC, such as SoC 210. One or more illumination sources (e.g., four illumination sources) may be provided on a ring array (such as ring array 207). For example, UV/blue, visible, NIR, and/or IR illumination sources may be provided on the ring array. The UV/blue wavelength may range from 370-415 nm. The visible wavelength may range from 415-670 nm and the NIR/IR wavelengths may cover 820-1700 nm wavelengths.

In examples, SWIR illuminants ranging from 1700-3000 nm may be incorporated for 3D macroscopic imaging, such as for in vivo 3D macroscopic imaging. The UV/blue illumination may be used to induce fluorescence of tissues. The visible illumination may be used for reflectance. The NIR/IR wavelengths may be used for reflectance and/or the modulated IR wavelength may be used for depth determination. The UV/blue and visible wavelengths may be used in combination with the multispectral camera. The NIR illumination may be used with the multispectral camera, for example, if the camera has NIR channels. Polarizers may be included in front of an illumination source and its respective sensor to reject specular reflection.

In examples, a NIR camera may be incorporated into the system 100 for NIR reflectance measurements. The modulated IR light may be used in combination with the ToF sensor for distance determination. The ToF sensor may not be sensitive to other wavelengths used for reflectance color measurements. Because the ToF sensor may not detect UV/blue or visible light, and the multispectral camera (e.g., snap-shot multispectral camera) may not be sensitive to the modulated IR light used for ToF, the 3D ToF image and visible camera image may be acquired (e.g., acquired simultaneously). Because the multispectral camera may be multiplexed to acquire fluorescence data, fluorescence and reflectance images may not be simultaneously acquired.

To acquire a 3D spectral image, the SoC may trigger (e.g., first trigger) the UV/blue light source (e.g., an LED). After a delay time of 1 μs-10 ms (e.g., to let the light source reach the desired intensity), the SoC may trigger (e.g., simultaneously trigger) the multispectral camera and ToF module to acquire the scene for a set integration time. The set integration time may be determined by the illumination intensity of the LED. After the multispectral camera and ToF module have acquired their respective images, the SoC may stop the UV/blue illumination. After a set time (e.g., delay time) determined by the amount of time the LED uses (e.g., requires) to stop illuminating the scene, the SoC may trigger the illuminants for reflectance spectroscopy. After a delay time of 1 μs-10 ms (e.g., to let the light source reach the desired intensity), the SoC may trigger the multispectral camera for a pre-determined integration time. The SoC may stop the reflectance illumination sources.

When the fluorescence, reflection, and ToF images have been captured, the SoC may combine the fluorescence and ToF, and the reflection and ToF images, into a depth encoded fluorescence 3D spectral image and a depth encoded reflectance 3D spectral image. The images may be displayed on an external display and/or SoC connected display. In other examples, the SoC may stream data to an external CPU or GPU, which may combine the images into depth coded images, as described herein. The external CPU or GPU may be one or more processors, such as processor(s) found in a personal computer or a cloud based computing platform.

Combining the depth encoded ToF image with the multispectral images may be performed by superimposing the ToF and multispectral images. If the pixel size and scene size of the ToF and multispectral images are different, the larger image may be rescaled, and pixels from one or more of the images may be interpolated to make a perfect overlap between the FOV of both images. The information of the multispectral image $I_{vis}$(x-pixel, y-pixel, n-channel) may be appended with the ToF image $I_{TOF}$(x-pixel, y-pixel, depth) to create the multispectral depth encoded image $I_{final}$(x-pixel, y-pixel, x-y depth, n-channel). The process may be repeated, for example, to acquire multiple images and stitch together larger 3D multispectral scenes.

After image acquisition, a stitching technique may be used to stitch the 3D multispectral images together to create larger scenes. In the stitching technique, features of the scene may be matched based on structure and depth from the ToF image $I_{TOF}$(x-pixel, y-pixel, depth). The IMU data may be used to account for orientation changes of the device, which may cause depth information changes. Because the depth information and/or angular orientation may be known, the change in the apparent size of the imaged object may be calculated. After considering orientation and depth, the feature matching part of the stitching technique may match and/or merge consecutive images (e.g., match and/or merge consecutive images into a larger depth and spectral encoded larger image).

A minimum feature match percentage between two or more (e.g., two) consecutive images may be required. For example, it may be required that 80% of the features from the previous image match the current image to successfully stitch the images together. In the stitching technique, the user may receive feedback from the system 100 to confirm successful stitching or if the user needs to rescan a specific volume. The feedback may be optical or vibrational. The stitching may be performed using the onboard SoC or streamed to an external processor, such as a personal computer or a cloud computing platform.

The internal visible camera may be used for IMU. The internal visible camera may be used for location tracking in combination with artificial intelligence techniques (e.g., artificial intelligence techniques using a neural network). In examples, the IMU data may be converted into a grid pattern which may be encoded and/or projected (e.g., directly encoded and/or projected) onto the image for classification by the neural network (e.g., trained neural network). In such examples, the IMU data may not need to be directly streamed or time stamped and coordinated separately from the image data. This technique may reduce the amount of data being streamed to and classified by the processor. The combinations of image and IMU for image location tracking may improve location tracking accuracy and/or image stitching.

In examples, the image data and/or IMU data may be streamed (e.g., streamed separately) with time stamps for location tracking. The orientation data from the IMU may be used with location tracking information via AI techniques (e.g., from a trained neural network) that classifies the image orientation. In examples, the image data may be used for orientation determination without the need of an external IMU. After orientation determination, a separate stitching technique may be used to match features of consecutive images, while considering orientation of the device, and perform 3D stitching. The technique may recognize and/or correct the image intensity data based on distance and angle from the target, which may affect illumination and scattering from the object (e.g., sample) to the sensor. The technique may be a standard pre-written technique or a trained neural network.

Artificial Intelligence (e.g., a trained neural network) may be used for classifying tissue conditions based on spectral information. For AI classification, the intensity corrected 3D image may be spatially unwrapped into a 2D texture image that may contain the spectral information. The 2D unwrapping may be performed using cylindrical or spherical unwrapping techniques. In some examples, a complex unwrapping that accounts for surface curvature without distorting the intensity in 2D space may be performed. AI (e.g., the trained neural network) may classify the spectral information, for example, in real-time.

Classifications may be pixel-by-pixel classifications, such as in the case of blood oxy-deoxy concentrations, blood volume, and/or blood metabolic rate. Classifications may be FOV classifications. Classifications may be classifications based on sets of binned pixels (e.g., in the case of noisy data where data smoothing may be necessary). Classifications by the neural network may relate to tissue health. The neural network may be trained to identify types of tissues and classify conditions specifically for the type of tissue. In examples, AI (e.g., the trained neural network) may modify the image in a heat-map or other color coding map to indicate score or severity of a condition or tissue health for ease of visual understanding by the user. After classification and/or image modification via AI techniques, the modified image may be re-wrapped around the 3D mesh to create the 3D diagnosed image. In the case of high speed imaging, AI techniques may look for differences in spectral intensity over the same region to determine biometric parameters such as tissue oxygen metabolism, pulse, and blood pressure.

Figure 7A:
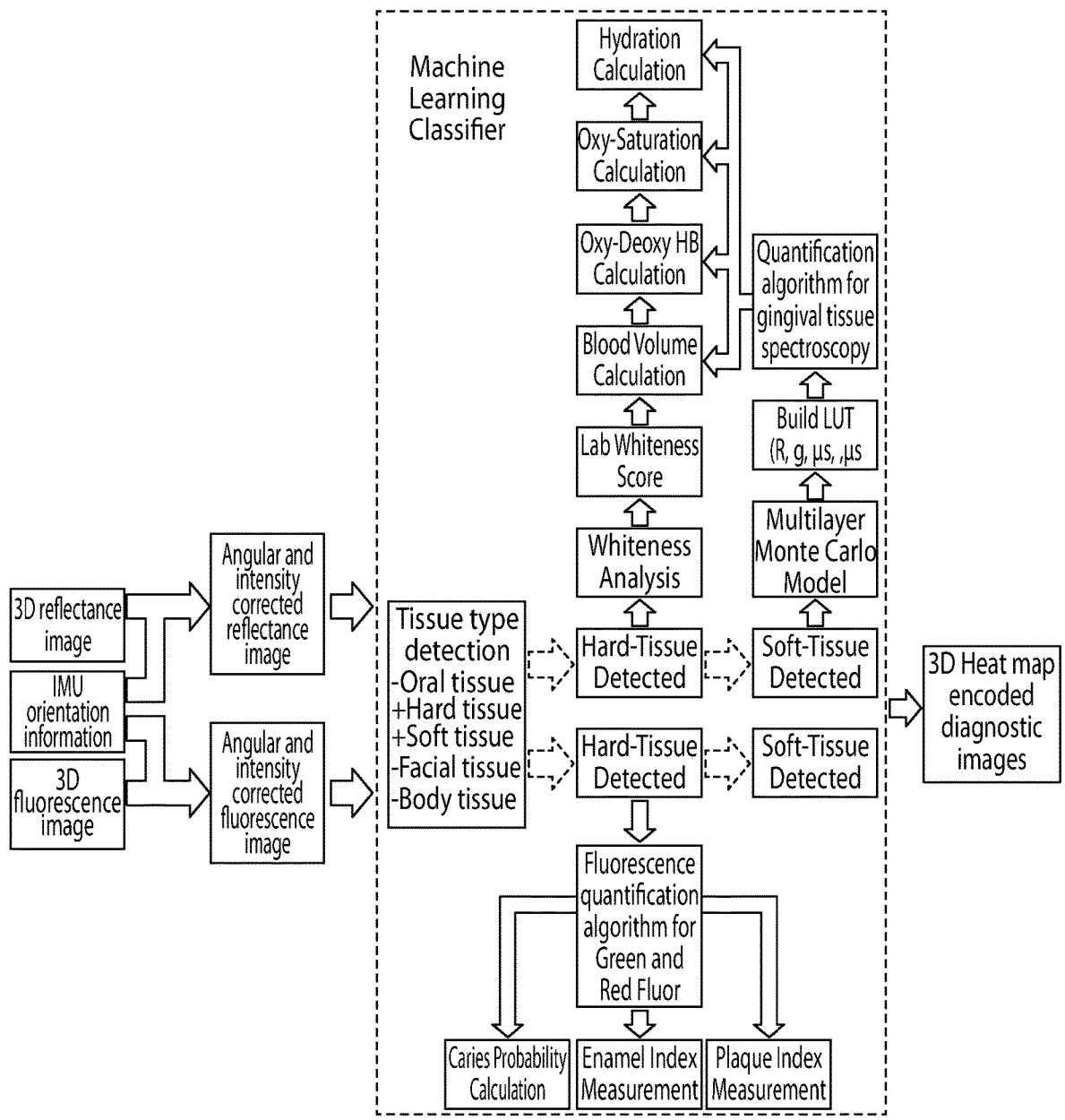
FIG. 7A is a block diagram of an example artificial intelligence classifier, as described herein.

FIG. 7A shows a block diagram of an example Artificial Intelligence (e.g., neural network) diagnostic technique. Image information (e.g., acquired image information) may be analyzed using techniques (e.g., Artificial Intelligence techniques) contained on the SoC. The image information may be provided to an external processor, such as an external computer or a cloud computing platform. The fluorescence image information may be analyzed for health information. For example, in the oral cavity the fluorescence multispectral information may contain information about dentine health, caries, potential caries areas, biofilms, porphryins, plaque, or potential cancerous spots. Bacteria on the surface of the face and pores may also be visible using fluorescence light and can be analyzed using this method.

Figure 7B:
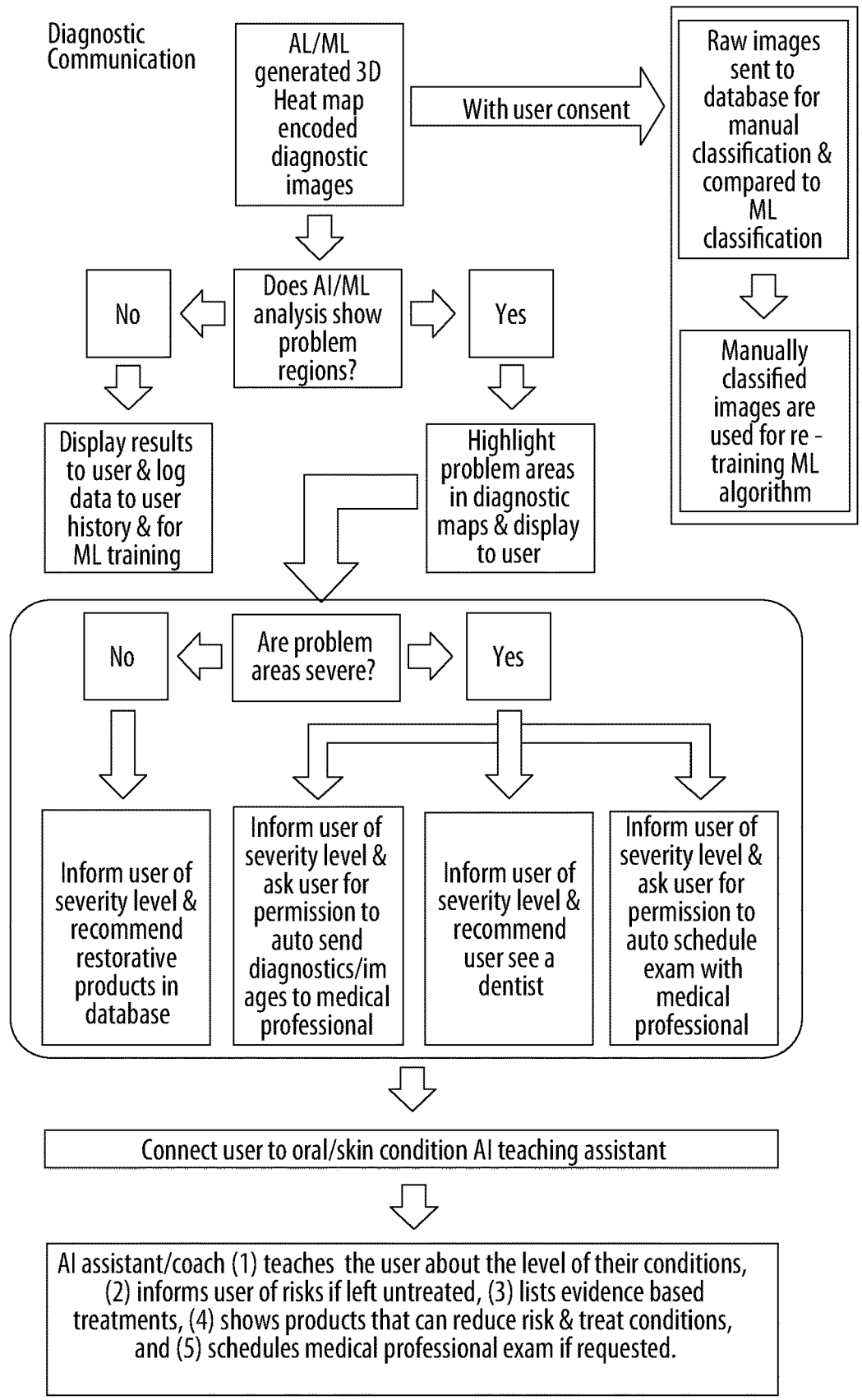
FIG. 7B is a block diagram of an example artificial intelligence communicator, as described herein.

Techniques for analysis of the oral cavity may include Artificial Intelligence (e.g., trained neural network) techniques and/or a pre-written standard technique that analyzes spectra. In the example of AI techniques, a neural network may be trained to recognize if the scanner is being used on oral tissue, facial tissues, or other body tissues. FIG. 7B shows a block diagram of an example Artificial Intelligence Communicator. The Artificial Intelligence Communicator may relay the diagnostic information to the user. After relaying the information, the Artificial Intelligence may explain the diagnostic results, make product recommendations, and/or arrange for an examination by a medical or dental professional. The location information may be used for analysis and classification by the diagnostic technique. The information may be displayed on a screen for a medical or dental profession to evaluate. The displayed information may be combined with software that allows the user to rotate the image and inspect the displayed information at various angles. After diagnosis by a medical or dental professional, raw data may be inserted into a relevant training folder for improving the Artificial Intelligence accuracy and/or diagnostic capabilities.

Reflectance data may be analyzed for tissue information. For example, in the case of soft tissue reflectance, spectral data may be used to determine the melanin distribution, blood oxy and de-oxy levels, blood volume, hydration, whiteness, hyperpigmentation. Spectral data may be used to diagnose skin conditions such as dry skin, rosacea, acne, skin cancer, dermatitis, sun damage, spider veins, versicolor, and melisma to name a few examples. Reflection image analysis may be performed using AI (e.g., a trained neural network) or a pre-written standard technique that analyzes spectra. The information may be displayed on a screen for a medical or dental profession to evaluate. The displayed information may be combined with software that allows the user to rotate the image and inspect the displayed information at various angles.

Figure 8:
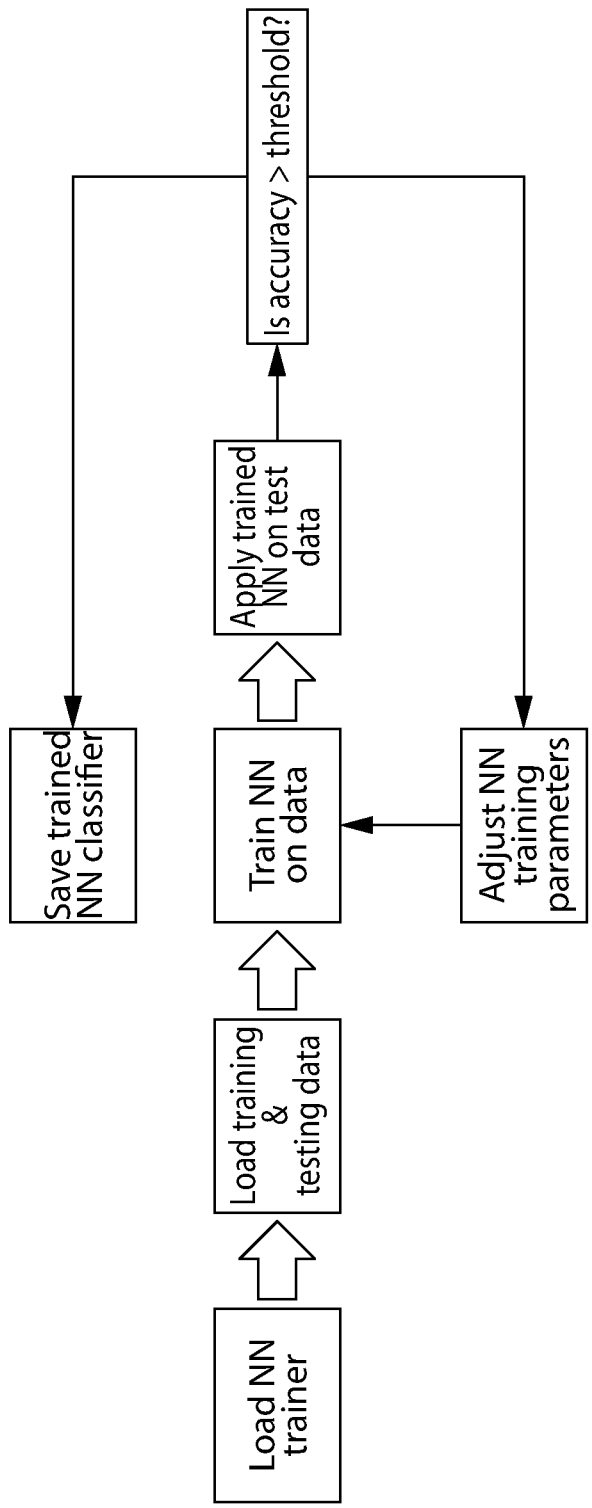
FIG. 8 is a block diagram of an example artificial intelligence model, as described herein.

FIG. 8 shows an example diagram for training a model (e.g., neural network) for image diagnostics. Neural network (NN) training may begin with loading of information, such as ground truth data. Ground truth data may include one or more images of specific tissue states, such as acne, dry skin, rosacea, acne, skin cancer, dermatitis, sun damage, spider veins, versicolor, melisma, etc. from users of different skin-types are placed in separate training folders. The neural network may be trained to recognize image features of each tissue state.

The trained neural network may be tested against other known data (e.g., ground truth data) that was not included in the training data folders to determine accuracy. To improve accuracy, additional training images may be provided and/or added. The model (e.g., neural network) may provide a percentage of how sure the model is of the diagnosis. If the accuracy of the data is above a threshold, the data may be saved (e.g., saved as a trained classifier). If the accuracy of the data is below a threshold, the data may be adjusted.

More complex layered models (e.g., neural networks) may be used, for example, for more complex analysis. As an example, a first layer neural network may be trained to recognize skin type. Skin type may range for the common four level classification to more complex classifications with greater than four levels of skin type classifications (e.g., melanin concentration). A second layer neural network may be trained on ground truth data from the predetermined skin type. With a skin type identified, other skin conditions and blood oxygen measurements can more accurately be determined or mapped.

Figure 9:
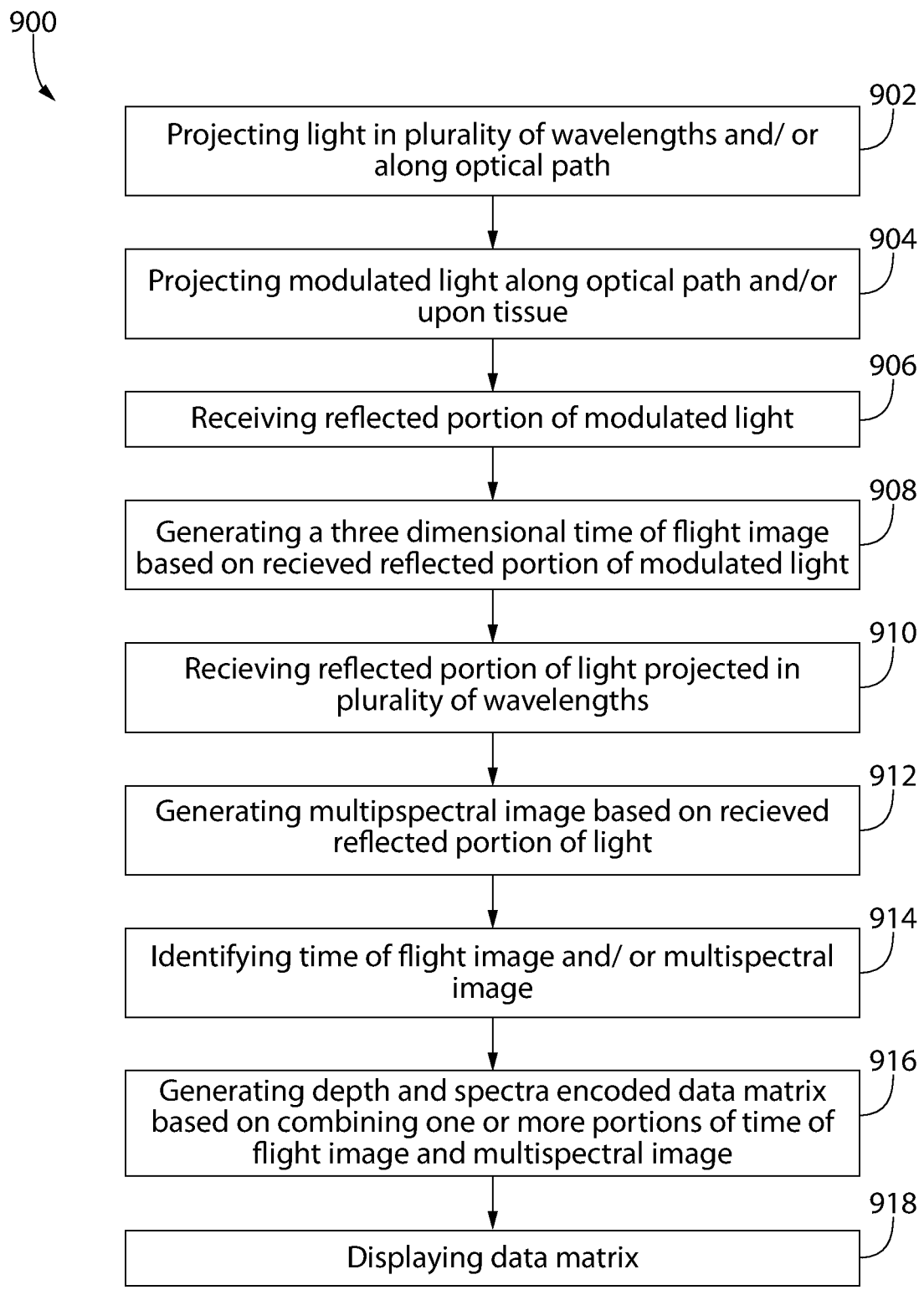
FIG. 9 is a flow diagram of an example method, as described herein.

FIG. 9 provides a flow diagram of an example method 900. At 902, light may be projected in a plurality of wavelengths and/or along an optical path. The light may be projected via a ring array having one or more LEDs configured to project the light upon a tissue (e.g., tissue within/about an oral cavity, skin tissue, facial tissue, etc.). At 904, a modulated light may be projected along the optical path and/or upon the tissue. The modulated light may be projected via a sparse illumination projector. At 906, a reflected portion of the modulated light may be received by a time-of-flight sensor. At 908, the time-of-flight sensor may generate a three-dimensional time-of-flight image based on the received reflected portion of the modulated light. At 910, a reflected portion of the light projected in the plurality of wavelengths may be received, for example, via a multispectral camera. At 912, a multispectral image may be generated by the multispectral camera based on the received reflected portion of the light.

At 914, the time-of-flight image generated via the time-of-flight sensor and/or the multispectral image generated via the multispectral camera may be identified. At 916, a depth- and spectra-encoded data matrix may be generated based on combining one or more portions of the time-of-flight image and the multispectral image. At 918, the data matrix may be displayed via a display.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. An oral hygiene imaging system for diagnosing oral cavity tissue, the system comprising:
   one or more light-emitting diodes (LEDs) configured to project, upon the tissue, light in a plurality of wavelengths and along an optical path;
   a multispectral camera configured to receive a reflected portion of the light projected in the plurality of wavelengths and generate a plurality of multispectral images based on the received reflected portion of the light;
   a time-of-flight module comprising a time-of-flight sensor and the one or more LEDs, wherein at least one LED is configured to project a modulated light along the optical path upon the tissue and the time-of-flight sensor is configured to receive a reflected portion of the modulated light projected upon the tissue and generate a plurality of three-dimensional time-of-flight images based on the received reflected portion of the modulated light;
   one or more mirrors configured to direct the projected modulated light along the optical path upon the tissue and to direct the reflected portion of the modulated light along the optical path from the tissue to the time-of-flight sensor; and
   a processor configured to:
      receive the plurality of three-dimensional time-of-flight images generated via the time-of-flight sensor and the plurality of multispectral images generated via the multispectral camera;
      identify the plurality of three-dimensional time-of-flight images and multispectral images;
      generate a plurality of depth- and spectra-encoded data matrices based on combining one or more portions of the plurality of three-dimensional time-of-flight images and the multispectral images;

stitch the plurality of depth- and spectra-encoded data matrices via a stitching technique, the stitching technique comprising at least:
  determine orientation and location in three-dimensional space via one or more three-dimensional time-of-flight images and inertial measurement unit data;
  match one or more first features of one or more scenes of the plurality of depth- and spectra-encoded data matrices based on structure and depth from one or more of the three-dimensional time-of-flight images to create one or more larger scenes in the plurality of depth- and spectra-encoded data matrices;
  match a predetermined percentage of one or more second features of one or more previous images to one or more current images to successfully stitch the plurality of depth- and spectra-encoded data matrices; and
  correct image intensity data of the stitched plurality of depth- and spectra-encoded data matrices based on distance and angle from a target; and
cause the stitched plurality of depth- and spectra-encoded data matrices to be displayed as a three-dimensional image via a display.

2. The system of claim 1, wherein the one or more mirrors are coated for reflecting the projected light.

3. The system of claim 1, wherein the one or more LEDs comprises at least one LED producing a wavelength ranging between 370-415 nm (UV/blue) for inducing fluorescence, at least one LED producing a wavelength ranging between 415-670 nm (visible) for reflection measurements, and at least one LED producing a wavelength ranging between 820-1700 nm for near-infrared/infrared (NIR/IR) reflection measurements.

4. The system of claim 1, wherein the one or more LEDs comprise a short-wave infrared (SWIR) light source for imaging into the tissue.

5. The system of claim 1, further comprising an optical filter positioned along the optical path, wherein the optical filter is configured to block non-IR light from the time-of-flight sensor.

6. The system of claim 1, wherein the time-of-flight module is positioned above an internal reflection mirror.

7. The system of claim 1, wherein the modulated light projected via the at least one LED passes through a visible-NIR reflection/IR transmission beam splitter before being incident upon the tissue.

8. The system of claim 1, further comprising a heated angled mirror head configured to direct the modulated light to the tissue, wherein the angled mirror head is heated to defog the mirror surface resulting from an inhale or exhale of the user of the system.

9. The system of claim 1, further comprising a haptic sensor configured to provide real-time feedback relating to scanning of the tissue.

10. The system of claim 1, further comprising a cleaning brush head, wherein the system is configured to perform a scanning of the tissue while the cleaning brush head is used to clean the tissue.

11. The system of claim 1, wherein the processor is configured to generate three dimensional (3D) topographic images for longitudinal morphological analysis of the tissue.

12. The system of claim 1, wherein the processor is configured to determine, based on the data matrices, at least one of spectroscopic, fluorescence, or colorimetric information relating to the tissue.

13. A method for diagnosing oral cavity tissue via an oral hygiene system, the method comprising:
  projecting, via one or more light-emitting diodes (LEDs), light upon the tissue in a plurality of wavelengths and along an optical path;
  projecting, via at least one LED of the one or more LEDs, a modulated light along the optical path and upon the tissue, and receiving a reflected portion of the modulated light projected upon the tissue;
  generating a plurality of three-dimensional time-of-flight images based on the received reflected portion of the modulated light;
  directing, via one or more mirrors, the projected modulated light along the optical path upon the tissue and to direct the reflected portion of the modulated light along the optical path from the tissue to a time-of-flight sensor;
  receiving a reflected portion of the light projected in the plurality of wavelengths and generating a plurality of multispectral images based on the received reflected portion of the light;
  identifying the plurality of three-dimensional time-of-flight images and multispectral images;
  generating a plurality of depth- and spectra-encoded data matrices based on combining one or more portions of the plurality of three-dimensional time-of-flight images and the multispectral images;
  stitching the plurality of depth- and spectra-encoded data matrices via a stitching technique, the stitching technique comprising at least:
    determining orientation and location in three-dimensional space via one or more three-dimensional time-of-flight images and inertial measurement unit data;
    matching one or more first features of one or more scenes of the plurality of depth- and spectra-encoded data matrices based on structure and depth from one or more of the three-dimensional time-of-flight images to create one or more larger scenes in the plurality of depth- and spectra-encoded data matrices;
    matching a predetermined percentage of one or more second features of one or more previous images to one or more current images to successfully stitch the plurality of depth- and spectra-encoded data matrices; and
    correcting image intensity data of the stitched plurality of depth- and spectra-encoded data matrices based on distance and angle from a target; and
  causing the stitched plurality of depth- and spectra-encoded data matrices to be displayed as a three-dimensional image via a display.

14. The method of claim 13, wherein the one or more mirrors are coated for reflecting the projected light.

15. The method of claim 13, wherein the one or more LEDs comprise at least one LED producing a wavelength ranging between 370-415 nm (UV/blue) for inducing fluorescence, at least one LED producing a wavelength ranging between 415-670 nm (visible) for reflection measurements, and at least one LED producing a wavelength ranging between 820-1700 nm for near-infrared/infrared (NIR/IR) reflection measurements.

16. The method of claim 13, further comprising providing, via a haptic sensor, real-time feedback relating to scanning of the tissue.

* * * * *